June 8, 1926.
H. R. MASSINGHAM
HEATING DEVICE
Filed April 4, 1924
1,588,122
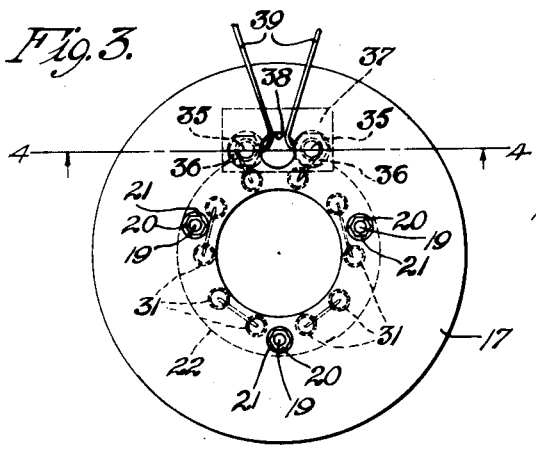
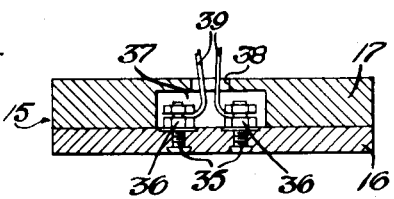
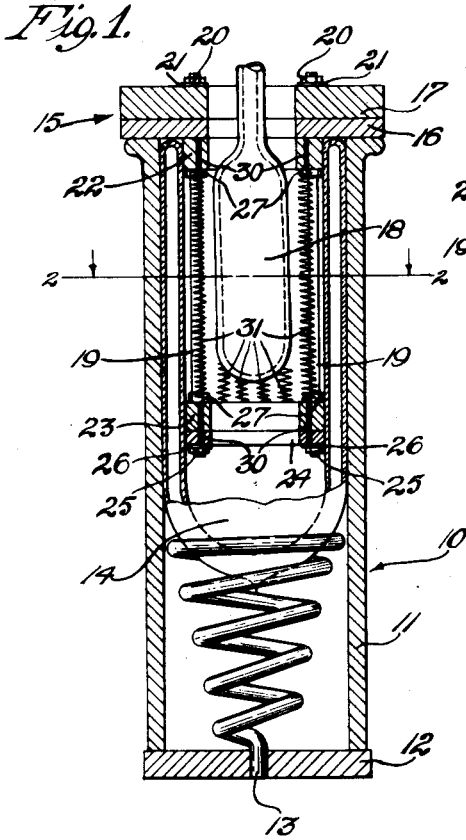
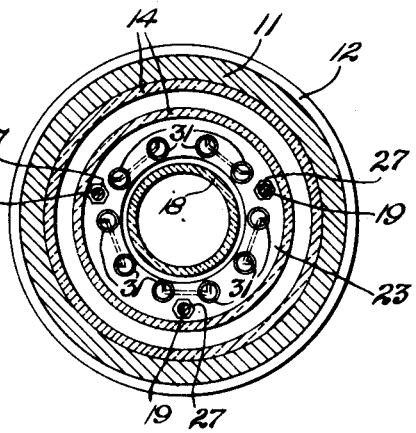
Inventor
Henry R. Massingham
by H. A. Puttum. Atty.

Patented June 8, 1926.

1,588,122

UNITED STATES PATENT OFFICE.

HENRY ROGERS MASSINGHAM, OF LA GRANGE, ILLINOIS, ASSIGNOR TO WESTERN ELECTRIC COMPANY, INCORPORATED, OF NEW YORK, N. Y., A CORPORATION OF NEW YORK.

HEATING DEVICE.

Application filed April 4, 1924. Serial No. 704,103.

This invention relates to heating devices and more particularly to a heater for mercury aspirators.

An object of this invention is to provide a heating device which can be raised to its maximum temperature quickly and cooled quickly.

Another object of this invention is to insulate electrical resistors more completely against heat loss.

A further object of this invention is to provide a heater for mercury aspirators which will quickly bring the mercury to the boiling point and permit rapid cessation of boiling.

Other objects and advantages of the present invention will more fully appear from the following detailed description and will be particularly pointed out in the appended claims.

In the accompanying drawings,

Fig. 1 is a cross-section of a heater showing a mercury reservoir of a mercury aspirator mounted therein;

Fig. 2 is a cross-section along the line 2—2 in Fig. 1.

Fig. 3 is a plan view of the heater, and

Fig. 4 is a cross-section along the line 4—4 of Fig. 3.

One embodiment of the invention is shown in the accompanying drawings in which like reference numerals are employed to designate similar members throughout the several views.

Referring to Fig. 1 the particular heating apparatus shown embodying the invention, comprises a container 10, having a cylindrical portion 11 and a base 12. Suitably attached to the base 12 is a spiral spring 13 adapted to support and protect a Dewar vessel 14. A circular cover 15, comprising a lower portion 16 and an upper portion 17, has a circular boring in the center thereof, adapted to admit an article to be heated; for example, a mercury reservoir 18 of a mercury aspirator (not shown). Spacing rods 19 are connected with the circular cover 15 by means of nuts 20 and washers 21. Suitably spaced on the spacing rods 19 are annular members 22 and 23, an auxiliary ring 24 being mounted below annular member 23, said auxiliary ring 24 and lower annular member 23 being secured to spacing rods 19 by means of nuts 25 and washers 26. Suitable means, such as nuts 27, is employed to hold the two annular members 22 and 23 in a fixed position with relationship to each other. A plurality of borings 30 is provided in the annular members 22 and 23 and a series of helices 31 are mounted between said annular members 22 and 23 by threading straightened portions of the wire thereof through the borings 30. The helices 31 may be formed from suitable electrical resistance wire. The annular members 22 and 23 may be formed from suitable heat resisting and dielectric material, for example, asbestos board; and the lower member 16 of the cover 15, together with the auxiliary ring member 24, may also consist of asbestos board. The two ends of the series of helices 31 are suitably secured to electrical terminals 35 which are mounted upon the lower member 16 of the cover 15 by means of nuts 36. The upper section 17 of the cover 15 has a hollowed out portion 37 large enough to contain the heads of the terminals 35 and an aperture 38 allows electrical leads 39 to be brought beneath the cover for the purposes of supplying electrical current to the heating element through the terminals 35. The heater may be mounted by any suitable means and the cover 15 carrying the heating element may be secured, if desired, to the container in any suitable manner.

A heater embodying the general features illustrated in the attached drawings and explained more in detail above can be raised to its maximum temperature very quickly because there is no mass of material to be heated, practically no heat being absorbed by the associated parts. The Dewar vessel 14 has very little volume of material and will absorb and retain practically no heat; while the container 10 is sufficiently insulated from the helices 31 by the Dewar vessel 14, so that very little heat from the resistor reaches it. This is highly advantageous in many instances, particularly when employing the heater with mercury aspirators in the evacuating of vacuum tubes. In the same operation it is often desirable to bring about instant cessation of boiling, and this is possible also with a heater of the type described above because there is no mass of material which will store up heat energy during the time the heater is in operation. When heat insulation material such as, for instance, a ceramic composition, is employed in place of the Dewar vessel, such material will absorb heat during the operation of the heater, and then give up that heat when the current to the heater is stopped. This absorbed heat is in general sufficient to keep the heater hot for a considerable time after generation of heat in the heater has stopped. Inversely when employing a heater of the type herein described, when the source of current is disconnected from the helices 31 the entire heater cools very quickly to a lower temperature.

A heater of this type is particularly adapted for heating mercury in a mercury aspirator, but its use is not to be confined thereto, but is to be limited only by the scope of the appended claims.

What is claimed is:

1. A heater for mercury aspirators comprising a mercury reservoir, an electrical resistor, a Dewar vessel, and means for mounting said resistor within said Dewar vessel and surrounding said reservoir.

2. A heater for mercury aspirators comprising a resistor formed by a series of helices, said helices equispaced in relationship to each other, and positioned so as to encompass the mercury reservoir of an aspirator, terminals for said resistor, a Dewar vessel, and means for mounting said resistor within said Dewar vessel.

3. A heater for mercury aspirators comprising a resistor formed by a series of helices, said helices equispaced in relationship to each other and positioned so as to encompass the mercury reservoir of an aspirator, terminals for said resistor, a Dewar vessel, means for mounting said resistor within said Dewar vessel, a container for the Dewar vessel, means for positioning said Dewar vessel within said container, and means within the container for the Dewar vessel for protecting said Dewar vessel against injury.

In witness whereof, I hereunto subscribe my name this 1st day of April, A. D. 1924.

HENRY ROGERS MASSINGHAM.